United States Patent [19]
Guentner

[11] Patent Number: 4,890,059
[45] Date of Patent: Dec. 26, 1989

[54] DIGITAL TACHOMETER WITH AIR GAP ADJUSTING YOKE INSERTABLE THROUGH HOLES IN THE TACHOMETER HOUSING

[75] Inventor: Herwig Guentner, Schwabach, Fed. Rep. of Germany

[73] Assignee: Siemens Aktiengesellschaft, Munich, Fed. Rep. of Germany

[21] Appl. No.: 255,978

[22] Filed: Oct. 11, 1988

[30] Foreign Application Priority Data

Oct. 23, 1987 [DE] Fed. Rep. of Germany ... 8714182[U]

[51] Int. Cl.⁴ .................. G01P 3/487; G01R 1/04; H05K 7/00
[52] U.S. Cl. ..................... 324/174; 73/518; 324/156; 324/208; 361/399
[58] Field of Search ............... 324/163, 166, 173, 174, 324/207, 208, 156; 310/155, 168; 73/518–520; 361/380, 397, 399

[56] References Cited

U.S. PATENT DOCUMENTS 3,742,243  6/1973  Gamble ........................ 307/106

FOREIGN PATENT DOCUMENTS 0194932  3/1986  European Pat. Off. .
2940610  4/1981  Fed. Rep. of Germany .
3219491  12/1983  Fed. Rep. of Germany ...... 324/208
2010099  2/1970  France .
2478897  3/1980  France .
0141509  9/1982  Japan ................................ 324/208
0086414  5/1985  Japan ................................ 324/208
2009939  6/1979  United Kingdom .

Primary Examiner—Gerard R. Strecker
Attorney, Agent, or Firm—Kenyon & Kenyon

[57] ABSTRACT

A magnet equipped rotating generator wheel cooperates with a stationary sensor cassette containing wire pulse sensors. The sensor cassette is electrically and mechanically fixed to a stiff circuit board to form a structural unit. The generator wheel and structural unit are enclosed within a housing having inner and outer parts, the outer part having a planar front surface. The structural unit is adjustably mounted to the planar front surface of the outer part of the housing of the tachometer. A pair of holes are formed in the circuit board at the air gap location and a corresponding pair of holes in the planar front surface so that the air gap between generator wheel and sensor cassette can be adjusted by inserting a spacing yoke.

4 Claims, 2 Drawing Sheets

DIGITAL TACHOMETER WITH AIR GAP ADJUSTING YOKE INSERTABLE THROUGH HOLES IN THE TACHOMETER HOUSING

BACKGROUND OF THE INVENTION

The invention relates to a digital tachometer having stationary wire pulse sensors that are separated from a magnet equipped generator wheel by an air gap. Such a tachometer requires accurate adjustment of the air gap between the wire pulse sensors and set and reset magnets mounted on the circumference of the generator wheel. This adjustment has been complex and difficult. For this purpose several sensors mounted in series as viewed in the circumferential direction of the generator wheel housed in a sensor cassette which extends over a portion of the generator wheel have been used. A need exists for a tachometer of this type in which the separation between the wire pulse sensors and the generator wheel is established in a simple and reliable manner.

SUMMARY OF THE INVENTION

The present invention provides a simple, functionally reliable, rugged and easily adjusted tachometer that requires few parts. Basically, the one or more wire pulse sensors are disposed within a sensor cassette which matches the curvature of the generator wheel. The sensors extend over a part of the circumference of the generator wheel. The sensor cassette is electrically and mechanically mounted to a stiff circuit board to form a structural unit. This unit is in turn mounted to an outer part of the housing of the tachometer, such as to be adjustable in a plane perpendicular to the generator wheel axis, and parallel to a front surface of the housing. Two adjustment holes in each of the housing and circuit board are aligned with the air gap to permit the legs of an adjusting yoke to be inserted and establish the air gap between the sensors and the generator wheel. After the air gap is established and the structural unit fixed in place, the adjusting yoke is removed.

DETAILED DESCRIPTION

Figure 1:
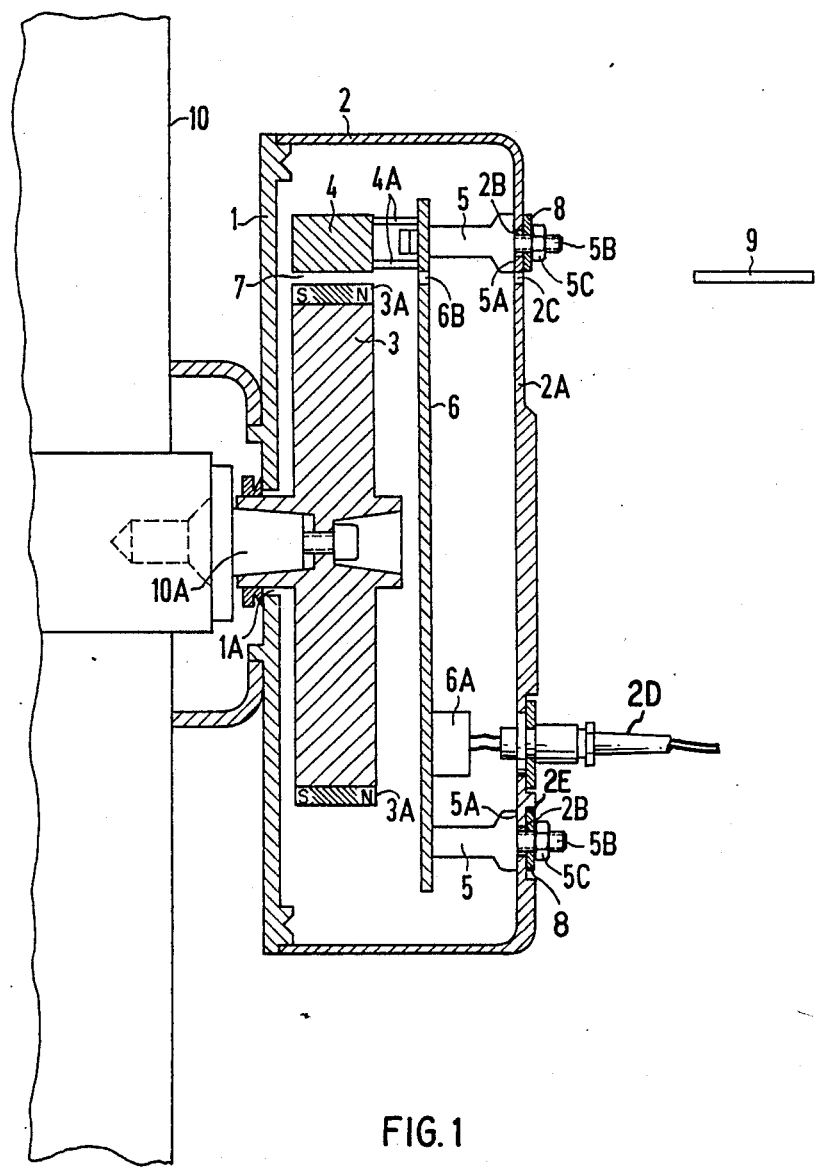
FIG. 1 shows a cross-sectional view of a tachometer according to the present invention.
Figure 2:
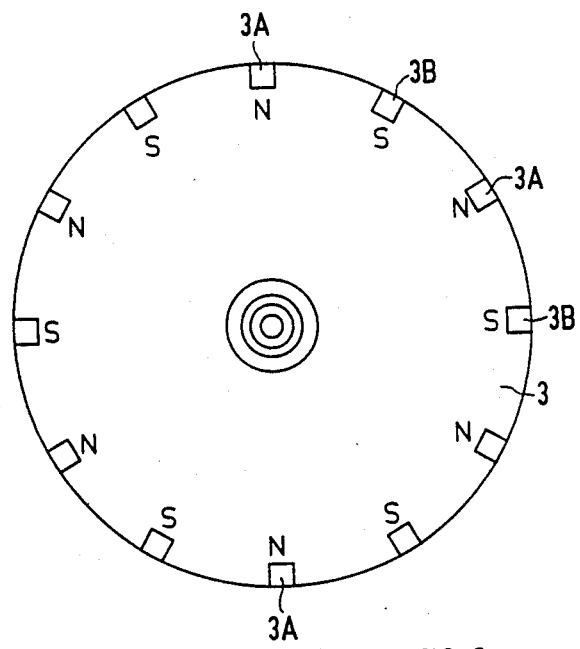
FIG. 2 shows a front view of the generator wheel shown in cross-section in FIG. 1.

As illustrated in FIGS. 1 and 2, the tachometer is coupled to a machine shaft 10A and detachably fastened to the machine housing 10. A two-piece housing includes an inner part 1 which is mounted to machine housing 10. A cap shaped outer part 2 connects to the inner part 1 to form a housing for a generator wheel 3. Set and reset magnets 3A, 3B are provided at the periphery of generator wheel 3. Shaft end 10A protrudes through a shaft hole 1A in inner part 1. A fixed sensor cassette 4 is mounted in the housing opposite the periphery of the generator wheel 3 and separated therefrom by an air gap 7. The sensor cassette 4 contains wire pulse sensors that are electrically connected to a rigid circuit board 6 which is adjustably mounted to outer part 2. Rigid fasteners 4A hold sensor cassette 4 in place as a unit on the circuit board 6. The strip conductors of circuit board 6 are connected to terminals 6A which are in turn connected to externally accessible line connectors 2D on the outer part 2. The sensor cassette 4 covers a segment of the periphery of the generator wheel 3 determined by the number of wire pulse sensors. The sensor cassette matches the curvature of the circumference of the generator wheel so that the thickness of the air gap 7 is the same over its entire extent once sensor cassette 4 is adjusted.

To permit the adjustment of air gap 7, circuit board 6 including sensor cassette 4, must be mounted to the front planar surface 2A of the outer part 2 in a manner such that the circuit board and sensor cassette can be adjusted in all directions while held in a plane perpendicular to the longitudinal axis of the shaft. The planar front surface 2A of the outer part 2 is aligned parallel to a plane that is perpendicular to the shaft.

To accomplish this mounting, spacing bolts 5 are fastened to and extend perpendicular to the circuit board 6. Each spacing bolt has the same length and a stop surface 5A at one end. Central pinshaped end parts have a relatively small cross section as compared to the stop surfaces 5A with screw threads 5B. The end parts extend through connecting holes 2B in the planar front surface 2A of the upper part 2. Lockwashers 8 on the outside of front surface 2A cover the smaller connecting holes. Fastening nuts 5C press lockwashers 8 against the outside of the front surface 2A. The circuit board 6 and the sensor cassette 4 on the outer part 2 are thus held in place. The diameter of the connecting holes 2B are smaller than that of the stop surfaces 5A and lockwashers 8 but larger than the pinshaped end parts 5B so as to facilitate adjustment.

The air gap 7 is adjusted as follows. Fastening nuts 5C are loosened. Two adjusting holes 2C aligned with the air gap area are formed in the outer surface 2A and two associated adjusting holes 6B are provided in circuit board 6. An adjusting yoke 9 is inserted through the adjusting holes in both the outer surface 2A and in circuit board 6. Adjusting yoke 9 has two parallel legs and a thickness that establishes the thickness of the air gap. The circuit board is clamped to outer part 2 in correct position by the fastening nuts 5C after first moving the loosened circuit board and inserting the adjusting yoke to obtain alignment. The adjusting yoke 9 is then removed. The tachometer mounted to the housing 10 of the machine can then operate.

The lockwashers 8 may be recessed in depressions 2E on the outside of front surface 2A. The depressions should have a larger diameter than the nuts 5C and lockwashers 8 so as not to hinder the adjustment movements.

I claim:
1. A digital tachometer adapted to be mounted on a shaft projecting from a machine housing comprising:
   (a) a generator wheel, having an axis, a circumference and a plurality of set and reset magnets distributed about the circumference, adapted to be coupled to a machine shaft;
   (b) a housing having a lower part adapted to be fastened to a machine housing from which the machine shaft projects and an upper part enclosing said generator wheel, said upper part having a planar front surface perpendicular to the axis of said generator wheel;
   (c) a structural unit comprising:
      i. a stiff circuit board;
      ii. a sensor cassette containing therein one or more wire pulse sensors, said sensor cassette extending over a part of the generator wheel circumference such that the wire pulse sensors therein are spaced from the circumference of said generator wheel by an air gap; and iii. means for electrically connecting and mechanically coupling said sensor cassette to said stiff circuit board;

(d) means for mounting said structural unit to the planar front surface of said upper part within said housing such as to be adjustable in a plane parallel to said planar front surface;

(e) two adjusting holes in said stiff circuit board, at the location of the air gap between said sensor cassette and said generator wheel, and two corresponding holes in said planar front surface of said upper part, whereby two legs of an adjusting yoke can be inserted through the holes in said planar front surface and the holes in said stiff circuit board to accurately establish a uniform air gap, whereupon said structural unit can be fixed relative to said planar front surface and said yoke then removed.

2. A digital tachometer according to claim 1 wherein said means for mounting said unit comprise:

a plurality of spacer bolts of equal length having stop surfaces at their faces extending from said circuit board, each of said spacer bolts having thinner threaded end parts extending from said stop surfaces;

an equal plurality of openings, larger than said thinner end parts but smaller than said stop surfaces, formed in said planar front surface, said thinner end parts extending through said openings;

lockwashers on the outside of said planar front surface surrounding said protruding thinner end parts; and fastening nuts threaded onto said thinner parts, whereby said fastening nuts can be screwed down on said threaded thinner parts to thereby clamp said unit into position after it is properly located utilizing a yoke.

3. A digital tachometer according to claim 1 and further including depressions in said planar front surface for receiving said lockwashers.

4. A digital tachometer according to claim 2 and further including depressions in said planar front surface for receiving said lockwashers.

* * * * *